United States Patent [19]
Steltner

[11] 3,779,382
[45] Dec. 18, 1973

[54] DYNAMICALLY EFFECTIVE OIL-GUIDE-BOOM AND METHOD FOR PURIFYING WATER EMPLOYING THE SAME

[76] Inventor: Hermanna R. Steltner, 5 Sparkes St., St. Catharines, Ontario, Canada

[22] Filed: Oct. 21, 1971

[21] Appl. No.: 191,264

[30] Foreign Application Priority Data
Nov. 2, 1970 Canada .................................. 30651

[52] U.S. Cl............. 210/83, 210/DIG. 21, 210/242
[51] Int. Cl........................ B01d 21/00, E02b 15/04
[58] Field of Search............... 210/83, 242, DIG. 21, 210/154

[56] References Cited
UNITED STATES PATENTS
| | | | |
|---|---|---|---|
| 3,537,587 | 11/1970 | Kain | 210/DIG. 21 |
| 3,563,380 | 2/1971 | Thomas | 210/DIG. 21 |
| 3,389,559 | 6/1968 | Logan | 210/DIG. 21 |

*Primary Examiner*—Samih N. Zaharna
*Assistant Examiner*—T. A. Granger
*Attorney*—Ralph D. Dinklage et al.

[57] ABSTRACT

An oil-guide-boom which is effective in the removal of surface oil and residue from flowing water is disclosed. The boom includes two support members and a sheet extending between the supports in a trough-like manner. The sheet comprises a wire mesh material and a non-woven fabric. In operation the boom is placed in water toward the direction of flow so as to allow water to pass through the mesh portion of the sheet and to collect in the trough portion of the sheet. The boom has particular utility in that its structure and materials allow continuous removal of surface impurities from flowing water. Method of purifying water containing oil on the surface thereof utilizing the oil-guide-boom is also disclosed.

9 Claims, 3 Drawing Figures

DYNAMICALLY EFFECTIVE OIL-GUIDE-BOOM AND METHOD FOR PURIFYING WATER EMPLOYING THE SAME

BACKGROUND OF THE INVENTION

The invention relates to a dynamically effective oil-guide-boom and to a method for removing oil spills and other residues from a water surface with this oil-guide-boom.

In the prior art, some 50 different types of oil booms are presently known, all for the common purpose to confine oil on limited and open waters, so that the oil can be removed in a correspondingly suitable manner. About six of such types of oil booms appear to be commercially preferred. Basically, all these oil booms are based on the principle of "barriers." All these barriers provide an oil and/or water impermeable skirt vertically suspended from floats in the water and held there by ballast weights. There are differences and variations in the size of floats, the skirts, the ballast, anchoring etc. There is furthermore one oil boom known which is arranged in such a manner that oil could flow into an incorporated molded trough from which it is then pumped out.

For a better understanding of the barrier-principle, reference is made to the paper by David P. Hoult, Department of Mechanical Engineering, Massachusetts Institute of Technology, entitled "Containment of Oil Spills by Physical and Air Barriers."

It is common to all oil booms based on the barrier principle that the efficiency decreases as the water velocity increases and this efficiency is further negatively effected by varying and non-uniform velocity distributions.

Manufactures of presently applied oil booms do not extend any unqualified guarantees of warranty of efficiency if the water stream velocity is in excess of 1.5 knots. This shortcoming results in a necessity to develop oil booms whose efficiency is commercially acceptable under conditions of greater water velocities and varying non-uniform velocity distributions.

This invention also relates to a method of removing oil from the surface of water by passing the water through an oil-guide-boom comprising a pair of floatable supports spaced apart and connected by a trough-like element disposed therebetween which trough-like element has a non-woven fibrous portion and is positioned at least in part below the surface of the support elements.

In view of the present status of technology, it appears at this time not feasible to remove oil by any of the known methods from agitated and/or foaming surfaces.

BRIEF DESCRIPTION OF THE INVENTION

The oil boom arrangement of the present invention to be more fully described, hereinafter, permits an efficient limitation of oil movement on water surfaces even at increased and non-uniform water velocities and permits a change in direction of the contained oil-water flow in such a manner that the removal of oil can be effected or achieved with existing apparatus without difficulties. In one embodiment, the instant oil boom comprises two floats between which extends a non-woven fabric sheet structure, the material being so arranged on the floats that, when in use, streaming water penetrates through the non-woven fabric while surface oil and residue is collected and removed. That the aforementioned results are possible and practical, was evidenced through tests of the dynamically effective oil boom on two sections, one 2m and the other 10m width.

DETAILED DESCRIPTION OF THE DRAWINGS AND PREFERRED EMBODIMENTS

Figure 1:
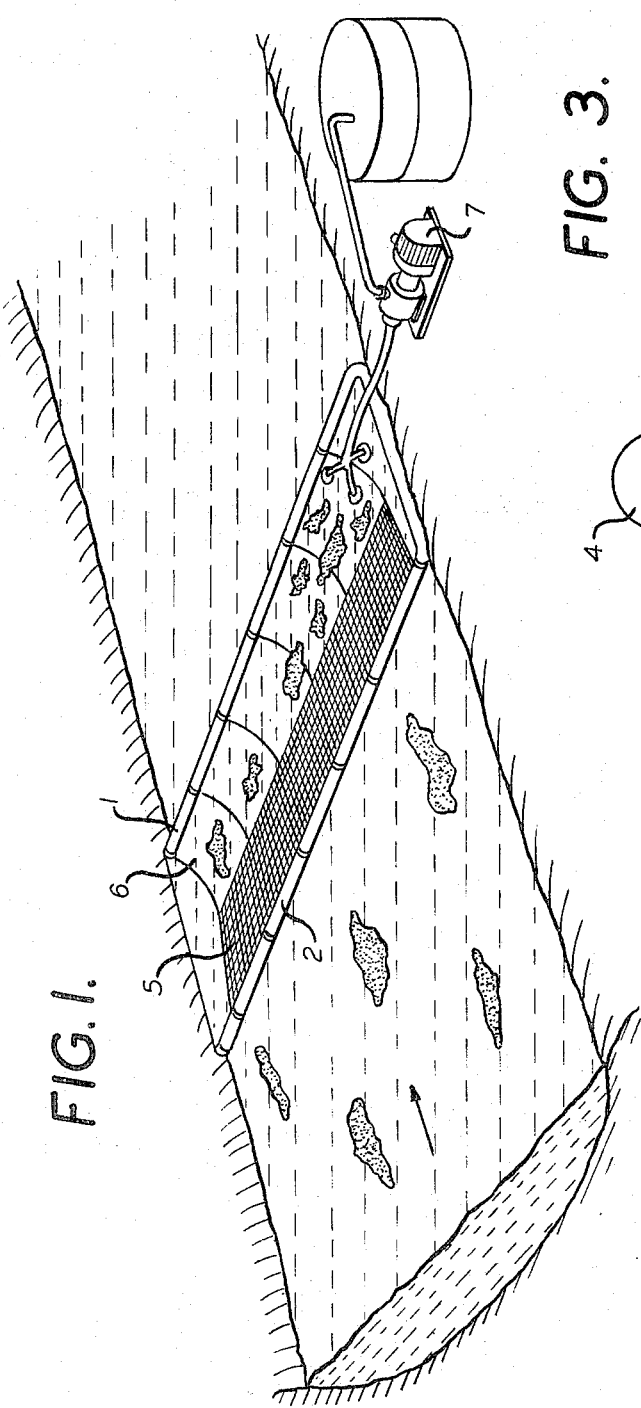
FIG. 1 demonstrates one embodiment of the oil boom of the present invention.

According to the embodiment demonstrated in FIG. 1, the surface of a river is cleared from oil spills. However it is also possible to remove oil spills on the open sea because the surface water in the ocean is always flowing with a certain speed. As shown in the figure the flow stream must also be directed towards the oil-guide-boom. While in no way to be interpreted as limiting the purview of utility of the present oil boom, for the sake of simplicity, the invention describes the purification of a river.

Figure 2:
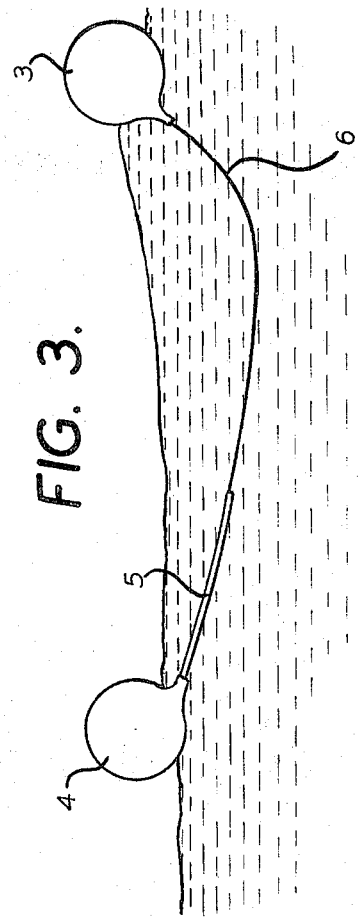
FIG. 2 shows a top view of the oil boom demonstrated in FIG. 1.
Figure 3:
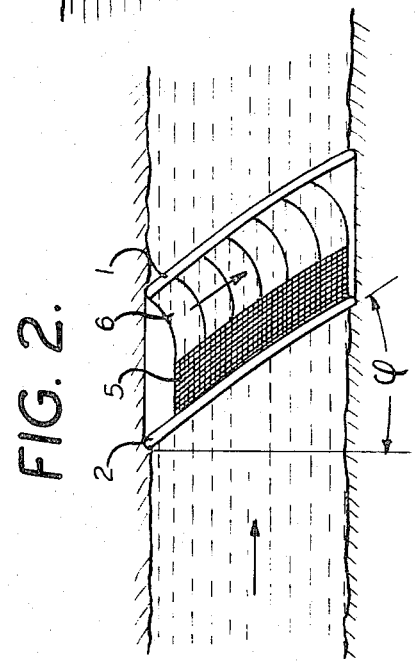
FIG. 3 shows another embodiment of the oil boom of the present invention.

As can be seen from FIGS. 1 and 3, two support members comprising two bars 1 and 2, or floats 3 and 4, are placed parallel at a certain distance on the water at an angle from the perpendicular to the direction of flow, as shown in FIG. 2, which angle is optimal and relative to the velocity of the water stream. Both bars 1 and 2, and floats 3 and 4, are connected by means of two sheets of different materials, both of which have a specific gravity greater than 1.0 (voids not included). When bars are utilized instead of floats it is of course possible to use two bars, which are extending over the river and which are fastened on both sides of the river. Figure shows such a bar over a river. If floats are used as demonstrated in FIG. 3, they have to be anchored at the bottom of the river or the sea.

In any case, referring to FIG. 3, the sheets of materials are arranged as follows:

A net 5 with relatively wide meshes is fixed at float 4.

Adjacently there is a non-woven fabric 6 (which may be reinforced by a fabric or a support member (see FIG. 1). The non-woven fabric, in turn, is held by the second float 3. As a result of the arrangement a trough forms naturally, in which by placing the whole arrangement at an angle $\phi$ to the flow as is demonstrated in FIG. 2, the diverted oil water mixture does move to one side and towards a point of evacuation. The specific characteristic of the reinforced non-woven fabric is that is contributes to a reduction of friction resistance. The selection of the most suitable non-woven fabric providing for an optimum of oil retention at a maximum rate of water permeability proceeded via tests in the laboratory as well as in the field.

The term "non-woven fabric" designates fibrous sheets structures, in which the fibers lie at first at random. Subsequently, these fibers are bonded together at their crossing points. When this bonding occurs, a stability is imparted to the loose starting fleece. The manufacture of non-woven fabrics is described in the book: NON WOVEN FABRICS AN UNBIASED APPRAISAL, A comprehensive report for industry prepared by graduate students of the Harvard Business School, Published by Nonwovens Associates, P.O. Box 328, Cambridge, Massachusetts, copyright 1959.

Non-woven fabrics which are bonded with an adhesive, are highly suitable for this invention. During the manufacture of such non-woven fabrics, the adhesive concentrates around the crossing points of the fibers, thereby forming filmy lamella shaped particles as shown in FIG. 4 of U.S. Pat. No. 2,719,802.

The void content of the non-woven fabrics needed for this invention amounts to at least 80 percent, preferably 85–92 percent. If the void content is less, the water can no longer stream through the non-woven fabrics. If the void content is too high, the oil may escape through the pores of such a non-woven fabric.

The efficiency of the above described non-woven fabric in the inventive Oil-Guide-Boom is based on two factors. Once they act as filters, oil and solid particles which are penetrated into the non-woven fabric, are retained therein. If the efficiency were solely based on a filter action, then the Oil-Guide-Boom would become ineffective after a relatively short time, because the pores of the non-woven fabric would be clogged by oil and other residues. Since, however, the water is dammed up if it streams towards the non-woven fabric, the penetration of oil and solids into the non-woven fabric is prevented. The oil is concentrated in the backwater of the trough, from which it is continuously removed. The life time of the inventive Oil-Guide-Boom is very long, because practically no oil and no solids deposit in the interior of the non-woven fabric.

One can also work without a trough. In this case, however, the non-woven apron must extend rather deep into the streaming water. This, in turn, means an increase of the streaming resistance. So the apron cannot extend straight into streaming water. It will be pushed away by the streaming water, so that it lies parallel to the streaming water. If the apron is anchored into the soil, one can prevent a pushing away, but in this case the pressure of the streaming water is so high that even stable non-woven fabric may tear.

For this reason, it is advisable to work with a non-woven trough, held by two floats (3 and 4 of FIG. 3) or two bars (1 and 2 of FIG. 1). In this case only a flat trough may form at the surface of the streaming water. The greater part of the water may flow underneath this trough without difficulties. In order to improve this streaming of the oil spills into the trough, those parts of the trough against which the water is streaming on, must be porous as possible. Therefore, this part of the trough consists of a wide meshed net or fabric. A backflow through this open net is not possible because further water is continously streaming against the trough.

The oil concentrates in the vicinity of the second bar or float, (1 and 3 of the figures). Underneath the second bar or float (1 and 3 of the figures), the bottom of the trough is formed by a non-woven fabric. This non-woven fabric allows the escape of water but retains the oil spills. Of predominant importance in respect to the oil retention and oil-flow diversion is the length ratio between net and reinforced non-woven fabric ($A_N : A_V$) an explanation of which will be given below. The ratio of $A_N : A_V$ should preferably be less than 1.

In the operational application sections or segments each 15–20m long will be connected or joined to provide for greater continuous length.

It has been empirically determined that the maximum length thus obtained is limited by strength characteristics not in excess of 20,000 kp. The application of the above described oil-guide-boom on the high seas, requires a greater strength of the materials. In this instance anchoring of the oil-guide-boom is anticipated.

The following definitions in conjunction with the figures shall serve for a better understanding of the nature of the invention.

B = Width of the oil-guide-boom
A = Distance between floats
U = Flow of water
$A_N$ = Width of the net
$A_V$ = Width of reinforced non-woven fabric
$d1/d2$ = Diameter of floats
= Angle of attack
U div. = Flow of water between floats A mathematical description of the phenomena demonstrated in the present invention would require consideration of the following:

The Forces on
— the floats or bars;
— the net;
— the non-woven fabric;
— the joints and connections;
— or the forces due to the shape of floats.

Such forces are interdependent and dependent on:
— the angle of attack;
— the current velocity;
— the water permeability of the reinforced non-woven fabric;
— the ratio $A_V : A_N$;
— the length of the oil-guide-boom;
— the current velocity between the floats; and
— the changes in the rate of water permeability due to the accumulation of suspended particles.

Further reference to FIG. 1 demonstrates the use of a pump 7 in combination with the oil-guide-boom of the instant invention. The pump operates to aid in the removal of oil and other residue from the trough area of the boom. The pump may be any conventional apparatus presently used for liquid transfer or removal.

It is to be understood that the net portion of the present oil-guide-boom can be any open pore, grating or net-like material which enables flowing water to pass to the non-woven fabric.

What is claimed is:

1. A boom for collecting oil from the surface of a body of water comprising, in combination:
   a. first and second longitudinal flexible buoyant members spaced apart in longitudinally opposed relationship;
   b. an oil collection barrier comprised of a non-woven fabric comprising oleophilic fibers, a first long edge of said fabric being connected to said second longitudinal flexible buoyant member in sealing relationship thereto;
   c. flexible connection means connecting a second oppositely disposed long edge of said non-woven fabric to said first longitudinal flexible buoyant member in spaced-apart relationship therefrom whereby liquid may flow under said first longitudinal member and over said second oppositely disposed long edge of said non-woven fabric and be collected between said second long edge and said long edge sealingly connected to said second longitudinal buoyant member.

2. A boom according to claim 1 wherein the void content of the non-woven fabric amounts to at least 80 percent.

3. A boom according to claim 2 wherein the void content of the non-woven fabric is between 85 and 92 percent.

4. A boom according to claim 1 wherein said flexible connection means is a fabric net.

5. Process for the removal of oil and residual matter from a running water surface employing a boom comprising, in combination:
   a. first and second longitudinal flexible buoyant members spaced apart in longitudinally opposed relationship;
   b. an oil collection barrier comprised of a non-woven fabric comprising oleophilic fibers, a first long edge of said fabric being connected to said second longitudinal flexible buoyant member in sealing relationship thereto;
   c. flexible connection means connecting a second oppositely disposed long edge of said non-woven fabric to said first longitudinal flexible buoyant member in spaced-apart relationship therefrom whereby liquid may flow under said first longitudinal member and over said second oppositely disposed long edge of said non-woven fabric and be collected between said second long edge and said long edge sealingly connected to said second longitudinal buoyant member, said process comprising passing the water containing oil and residual matter against said boom such that the oil first flows under said first longitudinal member and over said second oppositely disposed long edge of said non-woven fabric and said oil and residual matter is collected between said second long edge and said long edge sealingly connected to said longitudinal buoyant member.

6. A process according to claim 5 wherein the water is directed against the boom at an angle of less than 90° so as to allow the collected surface oil and residue to float towards one side of said boom.

7. A process according to claim 5 wherein oil separated from the water is removed from the inner region of said boom by pumping the same thereout.

8. A process according to claim 5 wherein the void content of the non-woven fabric is between 85 and 92 percent.

9. A process according to claim 6 wherein the water is flowing at a rate of at least 1.5 knots.

* * * * *

UNITED STATES PATENT OFFICE
CERTIFICATE OF CORRECTION

Patent No. 3,779,382     Dated December 18, 1973

Inventor(s) Hermann A.R. Steltner

It is certified that error appears in the above-identified patent and that said Letters Patent are hereby corrected as shown below:

Inventor's name should be "Hermann A.R. Steltner"

Column 2, line 50

"∅" should be "Q"

Column 1, line 9

After "boom" insert the following sentence:

-- This invention also relates to a method of removing oil from the surface of water by passing the water through an oil-guide-boom comprising a pair of floatable supports spaced apart and connected by a trough-like element disposed therebetween which trough-like element has a non-woven fibrous portion and is positioned at least in part below the surface of the support elements. --.

Signed and sealed this 1st day of October 1974.

(SEAL)
Attest:

McCOY M. GIBSON JR.
Attesting Officer

C. MARSHALL DANN
Commissioner of Patents